Oct. 17, 1961   R. F. PETERSON ET AL   3,004,329
HEAT EXCHANGER AND METHOD OF CONSTRUCTION
Filed Aug. 23, 1956
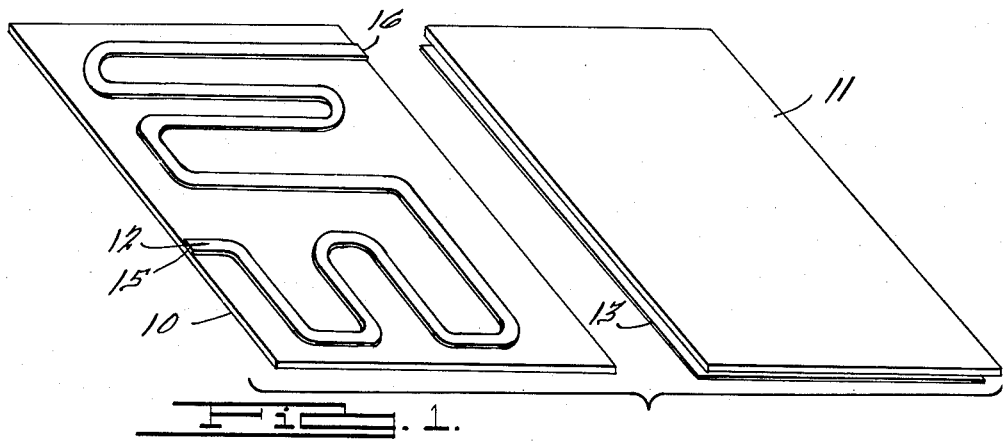
Fig. 1.
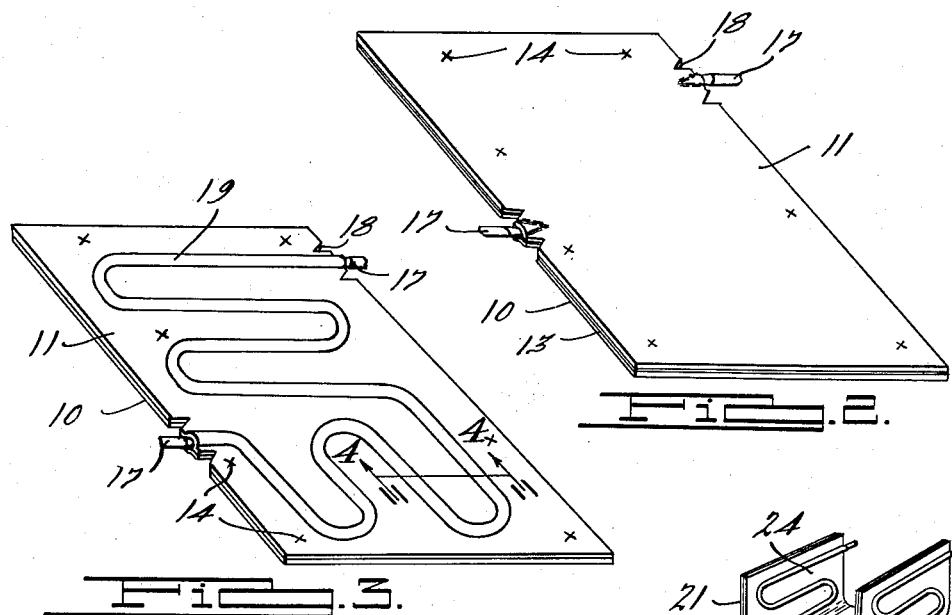
Fig. 2.
Fig. 3.
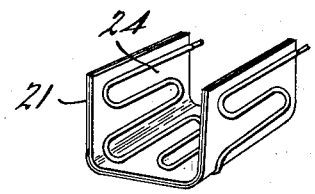
Fig. 6.
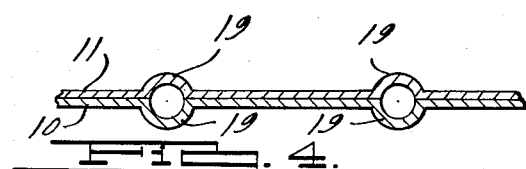
Fig. 4.
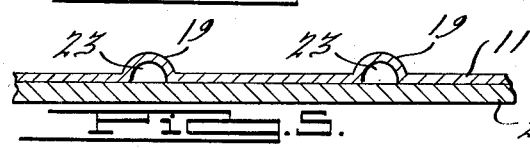
Fig. 5.
INVENTORS.
Ramon F. Peterson.
Francis J. O'Brien.
BY
Harness, Dickey & Pierce
ATTORNEYS.

United States Patent Office 3,004,329
Patented Oct. 17, 1961

3,004,329
HEAT EXCHANGER AND METHOD
OF CONSTRUCTION
Ramon F. Peterson and Francis J. O'Brien, Dowagiac, Mich., assignors to Rudy Manufacturing Company, Dowagiac, Mich., a corporation of Michigan
Filed Aug. 23, 1956, Ser. No. 605,735
4 Claims. (Cl. 29—157.3)

This invention relates to heat exchanger devices, and particularly to a fabricated pair of plates having a sinuous passageway therebetween, and to the method of producing a heat exchanger from a pair of plates.

Various heat exchangers were constructed heretofore having one or more sinuous paths formed in a pair of sheets before or after joining the sheets together by various methods. Such heat exchangers proved more or less commercially unsuccessful because of high cost, especially for the necessary tooling and because of the defective operation caused by the materials remaining in the passageway after manufacture.

The present invention pertains to a heat exchanger made from a plurality of plates and to the method by which the heat exchanger is constructed. The method produces between the plates a uniform sinuous passageway, after which the plates may be formed into the shape of the particular heat exchanger desired. The pair of sheets may be of like gauge and of like material, with a suitable "stop" material and bonding material disposed therebetween. The sheets may be of different gauge so that one side only will be expanded to form the passageway or the sheets may be of the same or different gauge and be of different material so that the sheet having the most ductility will be expanded by the pressure applied therebetween to form the passageway. The pair of sheets are thoroughly clean, especially on the faces which abut each other, and the bonding material likewise has its surface free of contaminating material. The "stop" material is placed upon at least one of the surfaces of a sheet and the bonding material is placed thereover or on the surface of the plate in the area not occupied by the "stop" material. The two sheets are then clamped together with the "stop" and bonding materials therebetween by any suitable means, as by clamps, rivets, tack-welding, spot-welding and the like.

If, for example, a pair of steel sheets of a like gauge are to be employed for the exchanger, a sheet of copper would be employed as the bonding material and placed between the steel sheets after the stop material has been placed on the surface of one of the sheets in the outline of the passageway to be formed. The sheet of copper material may have the area of the passageway cut therefrom so as to fill the area not occupied by the "stop" material. The secured sheets are then placed in a suitable oven to be heated to a desired temperature, and in the case of the steel sheets and copper bonding material, the assembly is placed in an atmospheric furnace. The proper type of heat will be employed for the particular bonding material and the metal of the sheets to be bonded. The "stop" material is brought to the edge of the sheets at both ends of the area to form the passageway.

After the heating and the immediate cooling of the assembled sheets, tubular nipples are welded into the separated portion of the sheets at the terminal ends of the path of "stop" material. The nipples are employed for the attachment of conduits for applying a liquid or gas under pressure to the unbonded area provided by the "stop" material which causes the material of the sheets to expand outwardly and provide a passageway of uniform cross section between the sheets. The metal forming the passageway may be expanded any desirable amount depending upon the pressure on the fluid so that the size of the passageway can readily be controlled both by the pressure employed and the width of the unbonded area. After the sheets have been expanded to form the passageway, the assembly may be bent to any desired shape to form the heat exchanger for the particular purpose for which it was designed. Any gas or fluid known to be suitable may be employed to produce the expansion of the sheet material and the sheets may be of any material or combination thereof which will function with a "stop" and bonding material in the manner above described. The pair of sheets may be made of steel, aluminum, copper alloy, iridium and the like of the same or different gauge, and may be used in combination with one another, that is to say, for example, a steel sheet may be bonded to a copper alloy sheet.

Accordingly, the main objects of the invention are: to provide a heat exchanger of rugged construction made without the use of costly dies and presses; to provide a heat exchanger made from a pair of sheets which are bonded together in all areas except that of the passageway to be formed therebetween by expanding the metal at the unbonded area; to employ a "stop" material and a bonding material between the faces of the sheets which produces the bonding of the material at all points except in the area defining the passageway, and, in general, to form a heat exchanger by a bonding method which is simple in construction and economical of manufacture.

Other objects and features of novelty of the invention will be specifically pointed out or will become apparent when referring, for a better understanding of the invention, to the following description taken in conjunction with the accompanying drawing, wherein:

FIGURE 1 is an exploded view of a plurality of sheets which are to be assembled and bonded together to form a heat exchanger of the present invention;

FIG. 2 is a view of the sheets after they have been assembled, heated and had tubular nipples applied thereto at the terminal ends of the unbonded configuration between the sheets;

FIG. 3 is a perspective view of the structure illustrated in FIG. 2 after the metal of the sheets has been expanded to form the passageway;

FIG. 4 is an enlarged sectional view of the structure illustrated in FIG. 3, taken on the line 4—4 thereof;

FIG. 5 is a view of the structure, similar to that illustrated in FIG. 4, showing another form of the invention, and FIG. 6 is a view of the assembled sheets bent into the shape of a desired heat exchanger.

In FIG. 1 a pair of sheets 10 and 11 are illustrated which are made of the same gauge and material. It is to be understood that the sheets may be of different gauge and one sheet may be of different material from the other sheet. When sheets of different gauge are employed, the one of lighter gauge may have all of the expansion occur therein, leaving the surface of the other sheet substantially flat. The same is true when different materials are employed, the more ductile material of the one sheet expanding under pressure while the other sheet remains substantially flat. For example, if a sheet of steel were bonded to a sheet of copper alloy, the softer copper alloy would take all of the expansion.

A "Stop" material 12 is shown as being applied in a sinuous path upon the sheet 10 in the area in which no bonding is to occur, which is the area following the shape of the passageway to be formed between the sheets. A copper sheet 13 is placed between the two sheets 10 and 11 if the sheets 10 and 11 are made of steel, which is herein assumed by way of example. An area may be cut from the sheet 13 the shape of the path formed by the "stop" material 12 so that the bonding material will cover all of the area about the path but will not be superimposed thereupon. It is not necessary, however, that such passagewaylike aperture be cut in the sheet of bonding material as it may extend over the "stop" material but will not bond to the portion of the face of the sheet covered by the "stop" material. It is to be understood that the faces of the sheets are thoroughly cleaned prior to the application of the "stop" material thereto.

The sheets 10, 11 and 13 are placed in alignment and clamped together by suitable clamps or may be secured together by rivets, tack or spot-welding, or by other means known in the art to be suitable. Spot welds are illustrated at the points 14 of FIG. 2. The assembly is then heated in an atmospheric furnace for a period of time to a desired temperature which will melt the bonding material and soften the adjacent faces of the sheets of steel so as to produce a perfect bond in the area of the sheet not occupied by the "stop" material 12. The bonded sheets are then removed from the furnace and immediately cooled to complete the bonding operation. It will be noted from FIG. 1 that the "stop" material 12 extends to the edge of the sheet 10 at the points 15 and 16 which will be the terminal ends of the passageway when formed. The sheets at these points are pried open and cylindrically formed to receive tubular elements 17 which are securely bonded thereto. The elements 17 are employed to connect the bonded sheets in a fluid pressure system. A fluid under presure, either liquid or gas, is forced between the sheets in the area occupied by the "stop" material 12 which is unbounded to cause the metal of the sheets to expand and form the passageway. The elements 17 are also useful for connecting the resulting heat exchanger into a conduit system in which it is to be eventually employed. Notches 18 may be cut into the sheet adjacent to the terminal points 15 and 16 of the "stop" material to simplify the formation of the sheets at the terminal points for the reception of the tubular elements 17 to be inserted therein. The fluid pressure expands the unbonded areas of the sheet which are the areas occupied by the "stop" material 12, as illustrated at 19 in FIG. 3.

The material which prevents the bonding of the bonding material to the surface of the sheets 10 and 11 will take different forms, depending upon the material to be bonded and the binding material required. For the steel sheets which are used as an example, the material which prevents the bonding of the copper thereto will be made up from the following formula:

15 oz. of chromic acid
1 gallon water
4 oz. barium chloride
1 fluid oz. of "Immunol Extra."

Immunol Extra is a product manufactured by Haas Miller Corporation of Philadelphia, Pa. The "stop" material may be applied in any manner, such as by painting equipment or by stamping, stenciling, rolling and the like. The assembly may be formed into any desired shape, depending upon the type of heat exchanger desired. In FIG. 6, the assembly is shown as having been formed into U shape to provide an evaporator 21 for a refrigerator. The sinuous form of the passageway may be varied in the evaporator walls as any pattern may be formed on the sheets, the one illustrated being by way of example rather than limitation.

In FIG. 5, a further form of the invention is illustrated, that wherein the sheet 11 is brazed to a sheet 22 of heavier gauge. The pressure applied through the tubular elements 17 expands only the wall portion 19 of the sheet 11, providing a semicylindrical-shaped passageway following the form of the unbrazed area. With this arrangement, the evaporator 21 would have a smooth inner surface 24 when the assembly is bent into U shape. The same result would be obtained if the sheets 10 and 11 were made from material of different ductility. The more ductile sheet would expand to form the semicylindrical passageway.

The heat exchanger of the type herein illustrated and described may be employed as a refrigeration evaporator, condenser, heating radiator, liquid cooling device, defrosting device and the like. The exchanger employing the steel sheets is of exceedingly light weight as light gauge material was employed, resulting in an assembly of exceptionally low cost. Further advantages resulting from the herein described heat exchanger and method are the avoidance of costly dies and the use of heavy presses, and the ease and low cost of the construction. For example, sample exchangers can be readily made at low cost with the same method employed for quantity production.

What is claimed is:

1. The method of forming a heat exchanger without the use of dies which includes the steps of: thoroughly cleansing a pair of metal sheets and bonding material which secures the sheets together, placing a "stop" material upon the face of at least one of the sheets conforming to the shape of a desired passageway the ends of which terminate at the edge of the sheet, securing the two sheets with the bonding and "stop" material therebetween together in unit relationship, heating said assembled sheets to melt the bonding material and secure the sheets together, forming an aperture between the sheets at least at one of the terminal ends of the passageway to be formed, and applying a fluid under pressure through said end to expand the metal defining the unbonded area to a degree determined by the pressure and amount of fluid employed to form the passageway.

2. The method of forming a heat exchanger which includes the steps of: thoroughly cleansing a pair of metal sheets and bonding material which secures the sheets together, placing a "stop" material upon the face of at least one of the sheets conforming to the shape of a desired passageway the ends of which terminate at the edge of the sheet, securing the two sheets with the bonding and "stop" material therebetween together in unit relationship, heating said assembled sheets, forming apertures between the sheets at the terminal ends of the passageway to be formed, bonding a pair of tubular elements in said apertures, and applying a fluid under pressure through said tubular elements sufficient to expand at least one of the sheets in the unbonded area of said "stop" material to form the passageway to a size controlled by said fluid and pressure.

3. The method of forming a heat exchanger without the use of dies which includes the steps of: thoroughly cleansing a pair of steel sheets and bonding material which secures the sheets together, placing a "stop" material upon the face of at least one of the sheets conforming to the shape of a desired passageway the ends of which terminate at the edge of the sheet, securing the two sheets with the bonding and "stop" material therebetween together in unit relationship, heating said assembled sheets, forming apertures between the steel sheets at the terminal ends of the passageway to be formed, and applying a fluid under pressure through said apertures sufficient to expand at least one of the sheets in the unbonded area of said "stop" material to form the passageway to a size controlled by the degree of application of the fluid pressure.

4. The method of forming a heat exchanger which includes the steps of: thoroughly cleansing a pair of metal sheets to be secured together, placing stop material over the face of one of said sheets conforming to the shape of a desired expanded area the ends of which terminate at the edge of the sheet, placing a sheet of bonding material over said face of the sheet and the stop material, placing the other sheet of the pair over said sheet of bonding material, securing the three sheets in predetermined relation to each other, heating the secured sheets to a temperature sufficient to melt the material of the bonding sheet for securing the surface of the sheets together at all points except that which is covered by the stop material, and expanding the area covered by the stop material through the application of fluid under pressure into the area from the edge of the sheet.

References Cited in the file of this patent

UNITED STATES PATENTS

| | | |
|---|---|---|
| 2,232,176 | Guthrie | Feb. 18, 1941 |
| 2,514,469 | Burkhardt | July 11, 1950 |
| 2,646,259 | Powell | July 12, 1953 |
| 2,646,971 | Raskin | July 28, 1953 |
| 2,690,002 | Grenell | Sept. 28, 1954 |
| 2,732,615 | Sandberg | Jan. 31, 1956 |
| 2,740,188 | Simmons | Apr. 3, 1956 |
| 2,779,086 | Ruppel et al. | Jan. 29, 1957 |